United States Patent
Kim et al.

(10) Patent No.: US 10,805,293 B2
(45) Date of Patent: Oct. 13, 2020

(54) METHOD FOR PROVIDING SERVICE UPDATE AND ELECTRONIC DEVICE SUPPORTING THE SAME

(71) Applicant: Samsung Electronics Co., Ltd., Gyeonggi-do (KR)

(72) Inventors: Joo Hyun Kim, Gyeonggi-do (KR); Hyoung Joon Park, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 111 days.

(21) Appl. No.: 16/100,893

(22) Filed: Aug. 10, 2018

(65) Prior Publication Data

US 2019/0068593 A1  Feb. 28, 2019

(30) Foreign Application Priority Data

Aug. 22, 2017  (KR) .......................... 10-2017-0106196

(51) Int. Cl.
| | | |
|---|---|---|
| *G06F 7/04* | (2006.01) | |
| *H04L 29/06* | (2006.01) | |
| *H04L 29/08* | (2006.01) | |
| *G06F 8/65* | (2018.01) | |

(52) U.S. Cl.
CPC ............ *H04L 63/0876* (2013.01); *G06F 8/65* (2013.01); *H04L 29/08981* (2013.01); *H04L 63/0853* (2013.01); *H04L 67/34* (2013.01)

(58) Field of Classification Search
CPC . H04L 63/0876; H04L 63/0853; H04L 67/34; G06F 8/65; G06F 21/31; G06F 21/44
USPC .............................................. 726/6; 713/168
See application file for complete search history.

(56) References Cited

U.S. PATENT DOCUMENTS

| 7,356,507 | B2 | 4/2008 | Bezos et al. |
| 8,612,343 | B2 | 12/2013 | Bezos et al. |
| 9,311,071 | B2 | 4/2016 | Tan et al. |
| 10,061,899 | B2 * | 8/2018 | Miller .................. A61M 1/282 |
| 10,068,061 | B2 | 9/2018 | Miller et al. |
| 10,089,443 | B2 | 10/2018 | Miller et al. |

(Continued)

FOREIGN PATENT DOCUMENTS

KR  101591289  2/2016

OTHER PUBLICATIONS

International Search Report dated Oct. 8, 2018 issued in counterpart application No. PCT/KR2018/008161, 14 pages.

(Continued)

*Primary Examiner* — Samson B Lemma
(74) *Attorney, Agent, or Firm* — The Farrell Law Firm, P.C.

(57) ABSTRACT

Methods and electronic devices are provided for providing a service update. First data including first information is received from a first external device as a second external device authenticates the electronic device as a target for an update of a first application program. A relevant interface is output by processing the first data. Second information related to the first application program stored in the electronic device is obtained in response to a user input applied to at least a partial area of the interface. Second data related to a request for the update of the first application program is transmitted to the first external device when the first information included in the first data corresponds to the second information.

20 Claims, 8 Drawing Sheets

(56) References Cited

U.S. PATENT DOCUMENTS

| | | |
|---|---|---|
| 10,095,840 B2 | 10/2018 | Miller et al. |
| 2002/0152163 A1 | 10/2002 | Bezos et al. |
| 2008/0027871 A1* | 1/2008 | Seo .................... G06F 21/10 |
| | | 705/59 |
| 2008/0262964 A1 | 10/2008 | Bezos et al. |
| 2013/0310726 A1 | 1/2013 | Miller et al. |
| 2013/0073400 A1* | 3/2013 | Heath .................... G06Q 30/02 |
| | | 705/14.73 |
| 2013/0073473 A1* | 3/2013 | Heath .................... G06Q 30/02 |
| | | 705/319 |
| 2014/0068588 A1 | 3/2014 | Tan et al. |
| 2014/0149348 A1 | 5/2014 | Choi et al. |
| 2016/0196130 A1* | 7/2016 | Shimizu .................... G06F 8/65 |
| | | 717/168 |
| 2016/0217265 A1 | 7/2016 | Miller et al. |
| 2016/0235901 A1 | 8/2016 | Miller et al. |
| 2016/0239637 A1 | 8/2016 | Miller et al. |
| 2017/0017480 A1 | 1/2017 | Zhang |
| 2017/0019399 A1* | 1/2017 | Yamazaki ........... H04L 63/0853 |
| 2017/0141968 A1 | 5/2017 | Lloyd et al. |
| 2017/0220769 A1* | 8/2017 | Miller ................ A61M 1/1603 |
| 2018/0075217 A1 | 3/2018 | Tiwari et al. |
| 2019/0036790 A1 | 1/2019 | Lloyd et al. |

OTHER PUBLICATIONS

European Search Report dated Apr. 24, 2020 issued in counterpart application No. 18848083.4-1224, 16 pages.
European Search Report dated Aug. 14, 2020 issued in counterpart application No. 18848083.4-1224, 18 pages.

\* cited by examiner

METHOD FOR PROVIDING SERVICE UPDATE AND ELECTRONIC DEVICE SUPPORTING THE SAME

CROSS-REFERENCE TO RELATED APPLICATION(S)

This application is based on and claims priority under 35 U.S.C. § 119(a) to Korean Patent Application No. 10-2017-0106196, filed in the Korean Intellectual Property Office on Aug. 22, 2017, the disclosure of which is incorporated herein by reference.

BACKGROUND

1. Field

The present disclosure relates generally to a service providing method, and more particularly to a method and electronic device for providing a service based on user authentication.

2. Description of Related Art

With the widespread use of electronic devices having independent operating systems, various functions are provided for user convenience. For example, the electronic devices may provide various types of functions or services based on application programs loaded or installed therein.

An application program may perform an update on a service that it provides. In this regard, an application program provider may provide a notification of the service update using a screen interface or a separate message of the application program. However, when a target for the service update is limited to some users, sending the service update notification to all users having service accounts may cause an increase in operating cost and security issues, such as an unnecessary use of user information.

SUMMARY

The present disclosure has been made to address at least the above problems and/or disadvantages and to provide at least the advantages described below. Accordingly, an aspect of the present disclosure provides a service update providing method, and corresponding electronic device, for reducing service operating cost or implementing high-level security by providing service update information of an application program to an authorized electronic device and authenticating the corresponding electronic device in a service update process.

According to an embodiment, an electronic device is provided that includes a communication module, a memory configured to store a first application program, a display, and a processor electrically connected to the communication module, the memory, and the display. The processor is configured to receive a request from an external device via the communication module, the request being related to update authority authentication for at least some groups, among a plurality of groups authenticated by using first information in connection with an update of the first application program. The processor is also configured to output, via the display, a user interface related to the request. The processor is further configured to transmit second information according to the request to the external device, based at least on a user input obtained via the user interface, such that the external device identifies an update authority of the electronic device for the at least some groups by using the second information. The processor is further configured to display, via the display, update information of the first application program obtained from the external device in connection with an operation of the first application program, when the update authority of the electronic device is identified.

According to another embodiment, an electronic device is provided that includes a communication module, a memory configured to store a first application program, a display, and a processor electrically connected to the communication module, the memory, and the display. The processor is configured to receive, from a first external device, first data including first information in connection with an update of the first application program as a second external device authenticates the electronic device as a target for the update. The processor is also configured to output a relevant interface by processing the first data. The processor is further configured to obtain second information related to the first application program from the memory in response to a user input applied to at least a partial area of the interface. The processor is additionally configured to transmit second data related to a request for the update of the first application program to the first external device, when the first information included in the first data corresponds to the second information.

According to a further embodiment, a method is provided for providing a service update by an electronic device. First data including first information is received from a first external device as a second external device authenticates the electronic device as a target for an update of a first application program. A relevant interface is output by processing the first data. Second information related to the first application program stored in the electronic device is obtained in response to a user input applied to at least a partial area of the interface. Second data related to a request for the update of the first application program is transmitted to the first external device when the first information included in the first data corresponds to the second information.

BRIEF DESCRIPTION OF THE DRAWINGS

The above and other aspects, features, and advantages of the present disclosure will be more apparent from the following detailed description when taken in conjunction with the accompanying drawings, in which.

DETAILED DESCRIPTION

Figure 1:
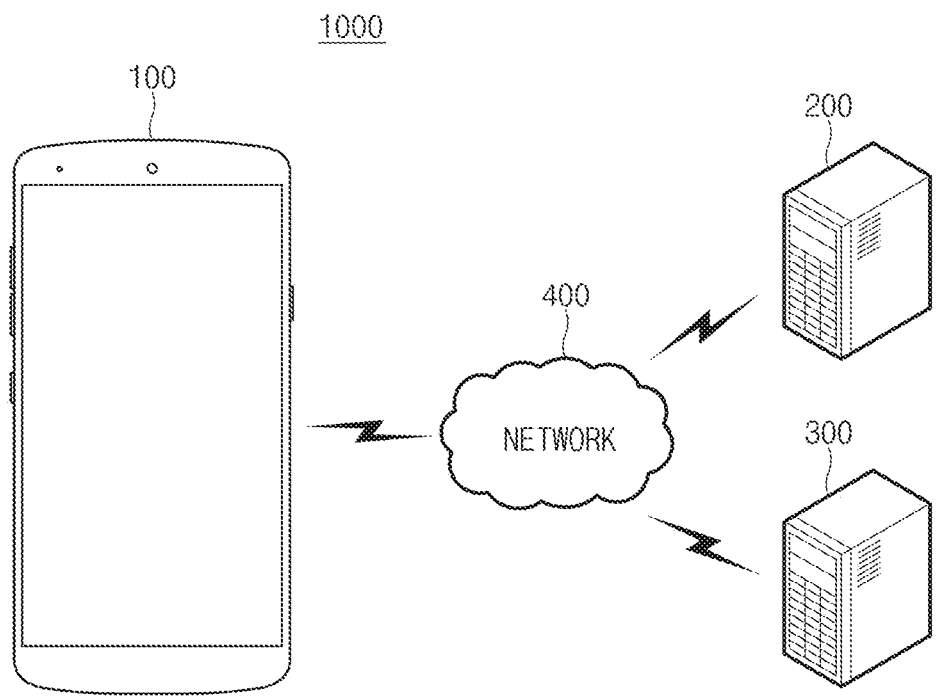
FIG. 1 is a diagram illustrating an operating environment of an electronic device, according to an embodiment.

Embodiments of the present disclosure are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present disclosure.

Prior to describing the present disclosure, an integrated intelligent system to which an embodiment of the present disclosure is capable of being applied is described in detail below.

FIG. 1 is a diagram illustrating an operating environment of an electronic device, according to an embodiment.

An electronic device 100 may include at least one application program that supports an operation of a specific function or service. The application program may include, for example, a preloaded application program (e.g., a watch, calendar, or gallery application program) loaded at the time of manufacturing the electronic device 100. Alternatively, the application program may include a third-party application program installed through an online market such as the App Store. In this regard, an application program provider (e.g., a manufacturer of the electronic device 100, an operating-system manufacturer, a mobile network operator, a third-party developer, or the like) may support an update on the function or service of the application program (e.g., an update on a previously supported function or service, an update on a new function or service, or the like). Furthermore, in regard to compatibility between the electronic device 100 and the application program, the application program provider may support a version update of the application program. The term "update", as used herein, may be understood as a comprehensive concept that includes the function update, the version update, or the service update of the application program.

Referring to FIG. 1, in regard to the update of the loaded or installed application program, the electronic device 100 may construct an integrated service system 1000 with at least one external device, such as an authentication server 200 and/or a contents providing server 300. At least some components (e.g., the electronic device 100, the authentication server 200, and/or the contents providing server 300) of the integrated service system 1000 establish a network 400 and may interact together based on the network 400. For example, the authentication server 200 may authenticate the electronic device 100 (or a user of the electronic device 100) to determine whether the electronic device 100 has the authority to perform the update or whether the electronic device 100 is a target for the update. The contents providing server 300 may transmit a message related to the update to the electronic device 100 authorized based on the determination of the authentication server 200. In response, the electronic device 100 may perform a series of update processes, based on at least one screen interface operating in conjunction with the message.

Thus, in regard to an update of a specific application program included in the electronic device 100 (e.g., an application program developed from the contents providing server 300), at least some components of the integrated service system 1000 may provide a route for the update to only a target (e.g., an electronic device or a user of the electronic device) authorized based on authentication. Hereinafter, various embodiments for an application program update based on authentication and functional operations of components implementing the embodiments will be described with reference to the accompanying drawings.

Figure 2:
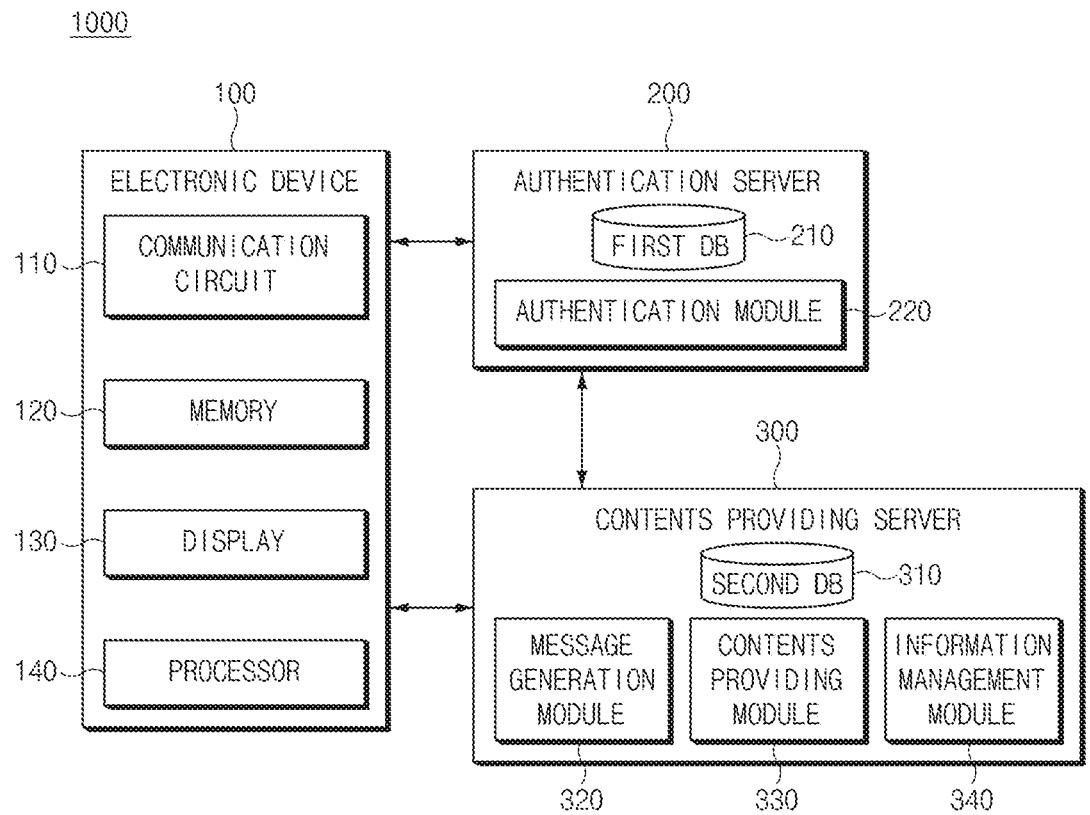
FIG. 2 is a diagram illustrating an integrated service system, according to an embodiment.

FIG. 2 is a diagram illustrating the integrated service system, according to an embodiment.

Referring to FIG. 2, the electronic device 100 in the integrated service system 1000 includes at least one of a communication circuit 110, a memory 120, a display 130, and a processor 140. In various embodiments, the electronic device 100 may not include at least one of the aforementioned components, or may further include other component(s). For example, the electronic device 100 may further include a power supply device (e.g., a battery) for supplying power to the components, a camera device (e.g., a front camera or a rear camera) for taking an image (e.g., a still image or a video) of an area around the electronic device 100, and/or a sensor device (e.g., a proximity sensor, an illuminance sensor, an acceleration sensor, a fingerprint recognition sensor, an iris recognition sensor, or the like) for sensing various types of information about an operating environment of the electronic device 100. Alternatively, the electronic device 100 may include components of an electronic device 701, described in greater detail below with respect to FIG. 7. According to an embodiment, the components of the electronic device 100 may be arranged inside or on a housing that implements at least a part of the exterior of the electronic device 100.

The communication circuit 110 (a communication module or a communication interface) may support communication between the electronic device 100 and at least one external device (e.g., the authentication server 200 or the contents providing server 300). For example, the communication circuit 110 may establish wired or wireless communication according to a specified protocol with the at least one external device and may access the network 400 based on the wired or wireless communication to exchange data with the at least one external device.

The memory 120 may store at least one piece of data related to an operation of the electronic device 100, or may store commands related to functional operations of the components in the electronic device 100. Alternatively, the memory 120 may store at least one application program and at least one piece of information related to an operation of the application program (e.g., account information, service subscription information, operation history information, or the like of the application program). The memory 120 may include a secure area implemented in hardware or software. The secure area may be accessible based on a specified signal or route and may store sensitive and private information (e.g., financial information or biometric information) that a specific application program involves.

The display 130 may output various types of contents. For example, the display 130 may output a screen interface related to the execution of any application program. According to an embodiment, the screen interface may include at least one screen interface for receiving a control input from a user in connection with an update of the application program. Alternatively, the display 130 may output information resources (e.g., a message to be described below) received from at least one external device. The display 130 may include a touch screen display and may receive a user input using at least a part (e.g., a finger) of a user's body or a touch pen (e.g., a stylus pen), based on the touch screen display.

The processor 140 may be electrically or operatively connected to at least one component of the electronic device 100 to perform control, communication operations, or data processing for the component. For example, the processor 140 may analyze or decode data received from at least one external device. In regard to processing of the received data, the processor 140 may control the execution of an application program related to the data and may load relevant information of the executed application program in the memory 120. Furthermore, when the external device authorizes the electronic device 100 (or a user of the electronic device 100) as a target for an update of a specific application program, the processor 140 may perform the update to support an operation of the function, version, or service of a new or updated application program. The functional operations of the processor 140 are described in greater detail below.

The authentication server 200 includes a first database 210 constructed to include at least one piece of information about a first application program, and an authentication module 220. The first application program may include, for example, an application program developed from the contents providing server 300. In this regard, a manager of the authentication server 200 and a manager of the contents providing server 300 may establish a relationship, such as cooperation or partnership.

The first database 210 may include identification information of an electronic device that includes the first application program (or in which the first application program is loaded or installed) or a user of the electronic device (e.g., account information, subscription information, operation history information, user information, or the like of the first application program). The first database 210 may include only a specified portion of identification information about all electronic devices including the first application program or all users (e.g., identification information of an electronic device or a user related to a specific group, organization, or institution; hereinafter, referred to as first identification information). In other words, the first database 210 may include only identification information about a specific electronic device or user among electronic devices or users that operate the first application program.

The authentication module 220 may determine whether at least one electronic device or user accessing the authentication server 200 is a target for an update of the first application program. The target for the update may be set to be all electronic devices or users corresponding to the first identification information on the first database 210 or an electronic device or a user that corresponds to second identification information that is a portion of the first identification information. The target for the update may be specified by the manager of the authentication server 210, or the manager of the authentication server 210 may specify the target for the update in response to a request of the manager of the contents providing server 300.

The authentication module 220 may allocate specified first authentication information (e.g., an ID, a password, an authentication code, or the like) to each electronic device or user corresponding to the first identification information or the second identification information (or an electronic device or user specified as an update target) and may compare the first authentication information with second authentication information provided by at least one electronic device or user accessing the authentication server 200. If the first authentication information and the second authentication information correspond to each other, the authentication module 220 may determine (or authorize) the electronic device or user accessing the authentication server 200 as a target for the update. The authentication module 220 may transmit identification information of the electronic device or user determined to be a target for the update to the contents providing server 300 in real time or according to a scheduled period.

According to an embodiment of the present disclosure, the contents providing server 300 may support an update of the first application program to at least one electronic device or user authorized for the update, based on update target determination information of the authentication server 200. To perform the above-described function, the contents providing server 300 includes at least one of a second database 310, a message generation module 320, a contents providing module 330, and information management module 340.

The second database 310 may include identification information of all electronic devices that include the first application program (or in which the first application program is loaded or installed) or all users. The second database 310 may map and store information about the function, version, or service of the first application program supported to all the electronic devices or users and identification information of the corresponding electronic devices or users. For example, the second database 310 may store the mapped information in the form of a table, a list, an index, or the like.

The message generation module 320 may generate a message with a specified form, based on identification information of an update target provided from the authentication server 200 (e.g., account information, subscription information, operation history information, user information, or the like of the first application program). An interface depending on the message may include, for example, guide information (e.g., text, an image, or the like) about the update of the first application program or an object (e.g., a tap button) to which a user applies an input in connection with the start of the update. The message generation module 320 may encrypt at least a portion of identification information of an update target provided from the authentication server 200 and may include the encrypted information in the message. Furthermore, the message generation module 320 may include, in the message, at least one command that allows the execution of the first application program and loading of information relevant to the first application program on an electronic device that is an update target. The message generation module 320 may transmit the generated message to a corresponding electronic device (e.g., an electronic device in which an update is to be performed), based on identification information of the update target. When a user of the electronic device applies an input (e.g., a touch) to a partial area of an object included in the interface depending on the message, the at least one command may be activated to execute the first application program and load the relevant information.

The contents providing module 330 may provide a function, version, or service according to the update of the first application program to the electronic device authorized as an update target. The contents providing module 330 may receive feedback and/or information relevant to the first application program (e.g., account information of the first application program) from at least one electronic device having received the message. Based on the feedback and/or the information relevant to the first application program, the contents providing module 330 may determine whether to provide an update of the first application program to the electronic device having provided the feedback and/or the information. In the case where providing the update is valid, the contents providing module 330 may support the first application program in which the function, version, or service is updated, to the corresponding electronic device.

The information management module 340 may manage the second database 310, based on the functional operation of the contents providing module 330. For example, when the contents providing module 330 supports the updated first application program to a specific electronic device or user, the information management module 340 may update or change information about the function, version, or service of the first application program mapped onto the specific electronic device or user on the second database 310. The information management module 340 may share the updated or changed information with the contents providing module 330.

According to an embodiment, the authentication server 200 or the contents providing server 300 may include at least one of a controller (or a processor) that controls functional operations of corresponding components, a storage device (or a memory) electrically connected with the controller, and a communication interface (a communication circuit or a communication module) that supports access to the network 140.

Figure 3:
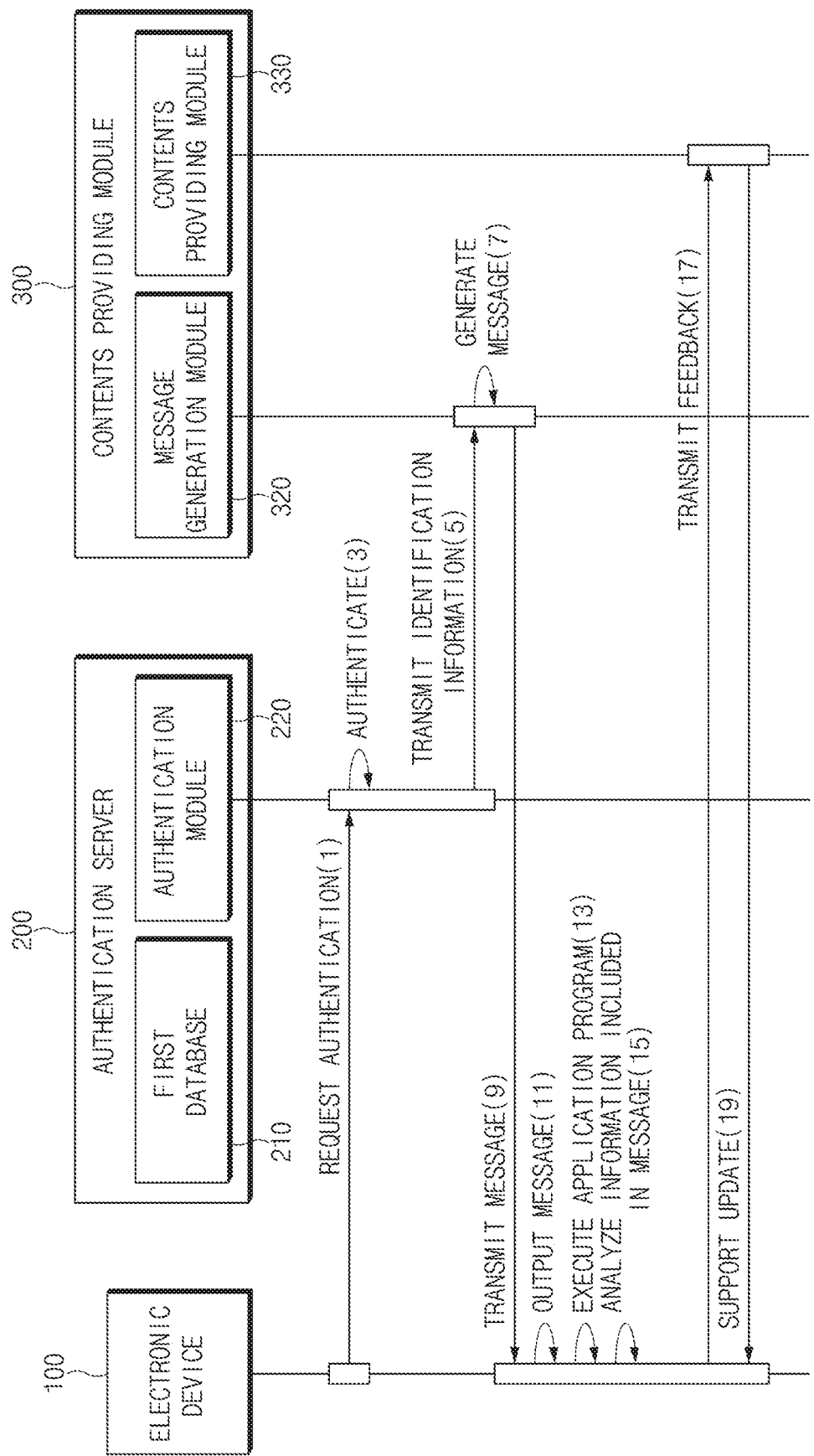
FIG. 3 is a diagram illustrating an application program update process, according to an embodiment.

FIG. 3 is a diagram illustrating an application program update process, according to an embodiment.

Referring to FIG. 3, in operation 1, the electronic device 100 accesses the authentication server 200 to request authentication for receiving a function, version, or service update of a first application program loaded or installed in the electronic device 100. For example, the electronic device 100 may request the authentication, based on specified authentication information (e.g., an ID, a password, an authentication code, or the like) that a user inputs through an interface (e.g., a web page) related to the authentication server 200. The authentication information, which is unique information allocated from the authentication module 220 of the authentication server 200, may be provided to some electronic devices specified as a target for the update of the first application program by the authentication server 200 or the contents providing server 300, among one or more electronic devices that include (or operate) the first application program.

In operation 3, the authentication module 220 of the authentication server 200 determines the validity of the authentication information provided by the electronic device 100 (or the user of the electronic device 100). For example, the authentication module 220 may determine the validity, based on whether the authentication information provided by the electronic device 100 corresponds to authentication information allocated to each electronic device specified as a target for the update of the first application program. The authentication module 220 may determine the electronic device 100 to be a target for the update of the first application program when the authentication information of the electronic device 100 is determined to be valid, or when the authentication information allocated to each electronic device specified as a target for the update and the authentication information provided from the electronic device 100 agree with each other. When a configuration is made such that the update of the first application program is supported for only some of the electronic devices specified as a target for the update, the authentication module 220 may determine whether the electronic device 100 is a target for the update of the first application program, based on whether the authentication information provided by the electronic device 100 and authentication information allocated to the some electronic devices agree with each other.

In operation 5, the authentication module 220 refers to the first database 210 included in the authentication server 200 to transmit identification information of the electronic device 100, which is determined to be a target for the update (or authorized as a target for the update), to the contents providing server 300. The first database 210 may include identification information about at least one electronic device specified as a target for the update (e.g., account information, subscription information, operation history information, user information, or the like of the first application program).

In operation 7 and operation 9, the message generation module 320 of the contents providing server 300 generates a message in a specified form and transmits the message to the electronic device 100 determined to be a target for the update. In the operation of generating the message, the message generation module 320 may encrypt at least a portion of the identification information of the electronic device 100 that is provided from the authentication module 220 of the authentication server 200 and may include the encrypted information in data related to the message. Alternatively, the message generation module 320 may include, in the data related to the message, at least one command that allows the first application program to be executed on the electronic device 100 and allows information related to the first application program to be loaded in the electronic device 100 (e.g., the memory 120 of the electronic device 100).

In operation 11, the processor 140 of the electronic device 100 processes the received message data and outputs a message interface on a screen of the display 130. The message interface may include an object (e.g., a tap button) for controlling the start of the update of the first application program. The processor 140 may implement the output of the message interface in various ways. For example, the processor 140 may output the message interface, based on the execution of at least one second application program (e.g., an application program related to an SMS, e-mail, chatting, a social network service, or the like) loaded or installed in the electronic device 100.

In operation 13, the processor 140 executes the first application program in response to user control over the message interface. For example, when a user input (e.g., a touch) is applied to at least a partial area of the object included in the message interface, the processor 140 may execute the first application program in response to activation of the at least one command included in the message data (e.g., a command related to the execution of the first application program and/or a command related to loading of information relevant to the first application program). In this operation, the processor 140 may make a first determination as to whether the first application program corresponding to the command is included in at least one application program operated in the electronic device 100 When the first application program corresponding to the command is not loaded or installed in the electronic device 100, the processor 140 may output a message that includes information for guiding download of the first application program or supports access to the App Store. Furthermore, the processor 140 may make a second determination as to whether information about the function, version, or service update of the first application program that is included in the message is applicable to the first application program included in the electronic device 100. If it is determined that the information is not applicable to the first application program, the processor 140 may output a message that includes specified information (e.g., "The function is not supported.").

The operations described below may be for a case in which, based on the first determination and the second determination, the electronic device 100 operates the first application program and the update information provided from the contents providing server 300 is applicable to the first application program being operated in the electronic device 100.

In operation 15, the processor 140 decodes encrypted information on the message data and may load, in the memory 120, first information related to the executed first application program. The processor 140 may compare the loaded first information and the decoded information (hereinafter, second information). For example, the processor 140 may determine whether the first information and the second information correspond to each other, by comparing user information corresponding to at least a portion of the decoded information with account information or service subscription information stored in the memory 120 in relation to an operation of the first application program. When the first application program involves sensitive and private information (e.g., financial information or biometric information), the processor 140 may access a secure area of the memory 120 to obtain (or load) the first information.

In operation 17 and operation 19, the processor 140 transmits, to the contents providing server 300, feedback including information on whether the first information and the second information correspond to each other and/or information relevant to the first application program (e.g., the account information of the first application program), and the contents providing module 330 of the contents providing server 300 may support the update of the first application program to the electronic device 100, based on the received feedback and/or information relevant to the first application program. For example, the contents providing module 330 may provide an updated function, version, or service of the first application program to the electronic device 100 in the case where the feedback represents that the first information and the second information correspond to each other and the information relevant to the first application program corresponds to the identification information received from the authentication server 200 (e.g., identification information of an electronic device or a user that is determined to be a target for the update of the first application program).

Figure 4:
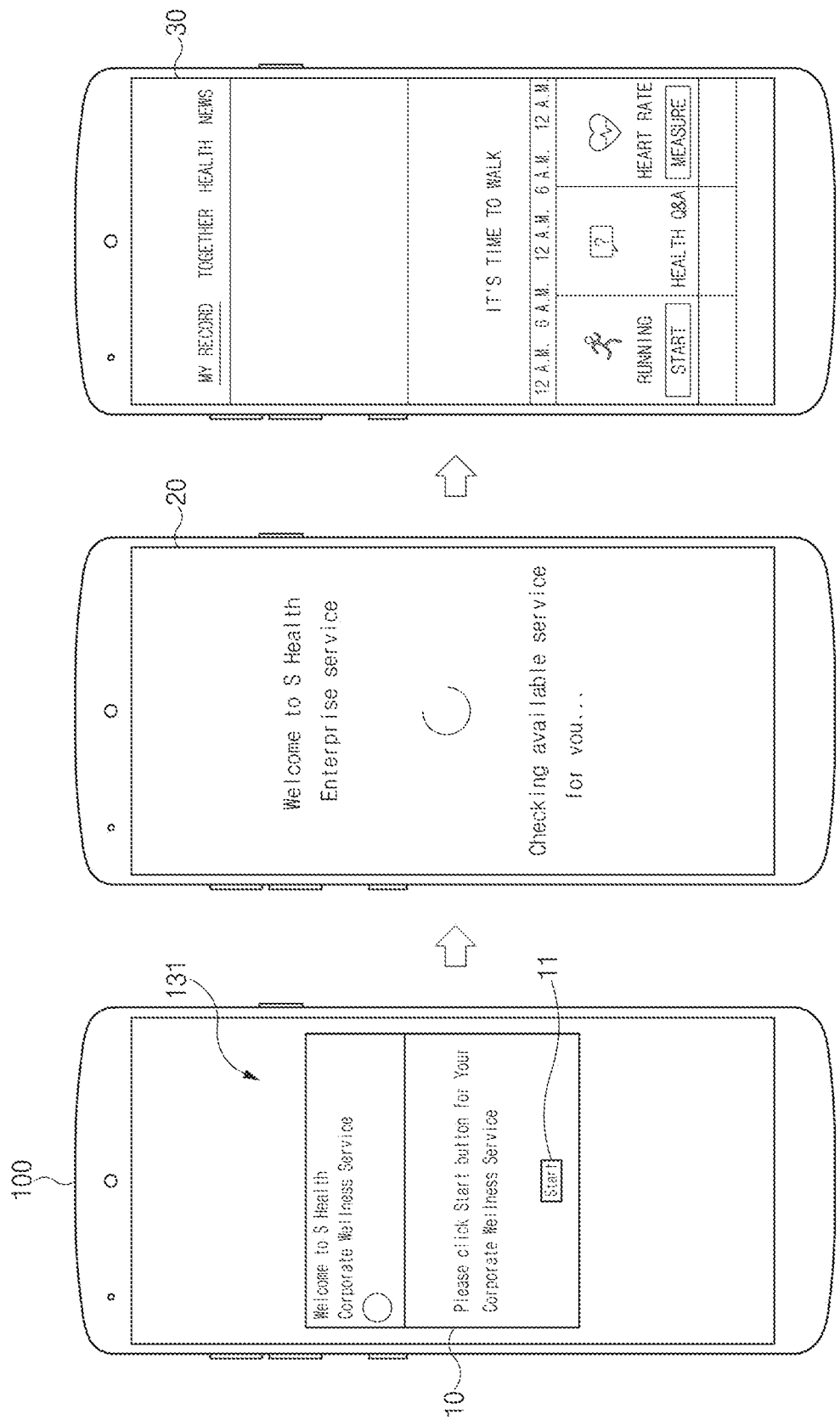
FIG. 4 is a diagram illustrating various screen interfaces related to an application program update of the electronic device, according to an embodiment.

FIG. 4 is a diagram illustrating various screen interfaces related to an application program update of the electronic device, according to an embodiment.

Referring to FIG. 4, the processor 140 of the electronic device 100 receives message data from the contents providing server 300 and outputs a message interface 10 on a partial area of a display screen 131. A user of the electronic device 100 refers to update guide information of the first application program that is included in the message interface 10 and controls the start (or execution) of the update. For example, the user may control the start of the update by applying a user input (e.g., a touch) to an object 11 (e.g., Start) included in a partial area of the message interface 10.

According to an embodiment, the user input to the object 11 may activate an execution command of the first application program that is included in the message data. When the execution command of the first application program is activated, the processor 140 may determine whether the first application program is included in at least one application program operated (loaded or installed) in the electronic device 100. Alternatively, the processor 140 may determine whether the update information of the first application program that is included in the message data is applicable to the first application program determined to be operated in the electronic device 100.

When it is determined that the first application program is operated in the electronic device 100 and updates are applicable to the first application program operated in the electronic device 100, the processor 140 executes the first application program and outputs a first interface 20 (e.g., a loading screen of the first application program) that represents a series of processing statuses for the update. The processor 140 may decode encrypted information included in the message data (e.g., identification information about an electronic device authorized as a target for the update or a user of the electronic device), as the series of processing. Alternatively, based on another command activated in response to the user input to the object 11, the processor 140 may determine whether the decoded information and relevant information of the first application program stored in the memory 120 correspond to each other, as the series of processing.

According to an embodiment, when the electronic device 100 satisfies an update condition of the first application program (e.g., the decoded information and the relevant information of the first application program on the memory 120 correspond to each other), the processor 140 may transmit feedback representing the satisfaction of the condition and/or account information of the first application program to the contents providing server 300. The contents providing module 330 of the contents providing server 300 may determine whether to provide an update of the first application program to the electronic device 100, based on the feedback and/or the account information of the first application program. For example, the contents providing module 330 may determine that providing the update of the first application program to the electronic device 100 is valid, when the feedback represents that the electronic device 100 satisfies the update condition of the first application program, or the account information of the first application program corresponds to identification information of a target for the update of the first application program that is provided from the authentication server 200 (e.g., identification information of an electronic device determined to be a target for the update or a user of the electronic device). Based on the determination, the contents providing module 330 may support a function, version, or service update of the first application program to the electronic device 100. Accordingly, the processor 140 of the electronic device 100 interacts with the contents providing server 300 to update the first application program, and when the update is completed, the processor 140 outputs a second interface 30 of the first application program (e.g., a main execution screen of the first application program) in which the function, version, or relevant service is updated.

Figure 5A:
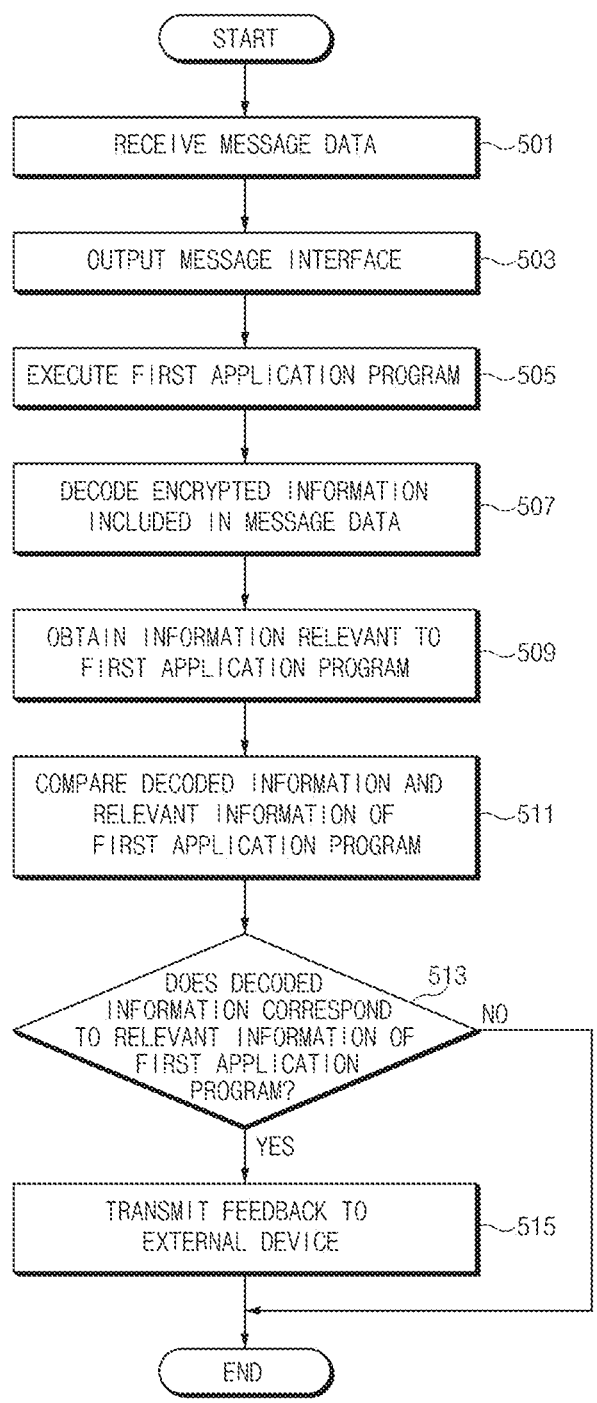
FIG. 5A is a diagram illustrating a series of processing operations related to an application program update of the electronic device, according to an embodiment.

FIG. 5A is a diagram illustrating a series of processing operations related to an application program update of the electronic device, according to an embodiment.

Referring to FIG. 5A, in step 501, in regard to an update (e.g., a function, version, or service update) of the first application program loaded or installed in the electronic device 100, the processor 140 of the electronic device 100 receives message data from a first external device (e.g., the contents providing server 300) understood as a developer of the first application program.

According to an embodiment, the receipt of the message data from the first external device 300 may be based on the assumption that the electronic device 100 is authorized as a target for the update of the first application program. In this regard, in the case where the electronic device 100 is included as a target for the update of the first application program, the processor 140 may be allocated specified authentication information (e.g., an ID, a password, an authentication code, or the like) by a second external device (e.g., the authentication server 200) and may request the second external device 200 to authenticate the target for the update, based on the authentication information. The second external device 200 may determine the electronic device 100 to be a target for the update of the first application program in the case where the authentication information allocated to the electronic device, which is a target for the update, and the authentication information provided by the electronic device 100 correspond (or agree) with each other. The second external device 200 may manage identification information of at least one electronic device (or a user) that includes (or operates) the first application program (e.g., account information, subscription information, operation history information, user information, or the like of the first application program), as a database and may refer to the database to transmit the identification information of the electronic device 100, which is determined to be a target for the update, to the first external device 300. The first external device 300 that receives the identification information of the electronic device 100 may generate message data to be transmitted to the electronic device 100. For example, the first external device 300 may generate message data including at least one of encrypted information in which at least a portion of the identification information is encrypted, a first command related to the execution of the first application program, a second command related to loading of information relevant to the first application program, and update guide information of the first application program.

In step 503, the processor 140 of the electronic device 100 processes the message data received from the first external device 300 to output a message interface. The update guide information (e.g., text, an image, or the like) of the first application program included in the message data and/or an object (e.g., a tap button) for controlling the start of the update may be displayed in a partial area of the message interface.

In step 505, the processor 140 executes the first application program loaded or installed in the electronic device 100, in response to a user input (e.g., a touch) applied to at least a partial area of the object. For example, the processor 140 may execute the first application program in response to the first command activated in response to a user input to the object. The processor 140 may determine whether the first application program related to the first command is included in at least one application program operated in the electronic device 100. Alternatively, the processor 140 may determine whether the update information of the first application program included in the message data is applicable to the first application program being operated in the electronic device 100.

In steps 507 and 509, the processor 140 decodes the encrypted information included in the message data and loads information related to the first application program in the memory 120 in response to the second command activated in response to a user input to the object. Steps 505, 507, and 509 described above may be performed at the same or similar time or may be performed according to a scheduled sequence.

In step 511, the processor 140 compares the decoded information and the information loaded in the memory 120. For example, the processor 140 may compare user information obtained by decoding the encrypted information in which the identification information is encrypted and account information or service subscription information of the first application program that is loaded in the memory 120.

In steps 513 and 515, the processor 140 generates feedback in a specified form, based on the comparison result. For example, when the decoded information and the information relevant to the first application program correspond to each other, the processor 140 may generate feedback including the comparison result information and may transmit the feedback to the first external device 300. Alternatively, the processor 140 may transmit, to the first external device 300, information relevant to the first application program (e.g., account information of the first application program) together with the feedback. The first external device 300 may refer to the feedback and/or the relevant information of the first application program, which is received from the electronic device 100, to support an update of the first application program to the electronic device 100.

Figure 5B:
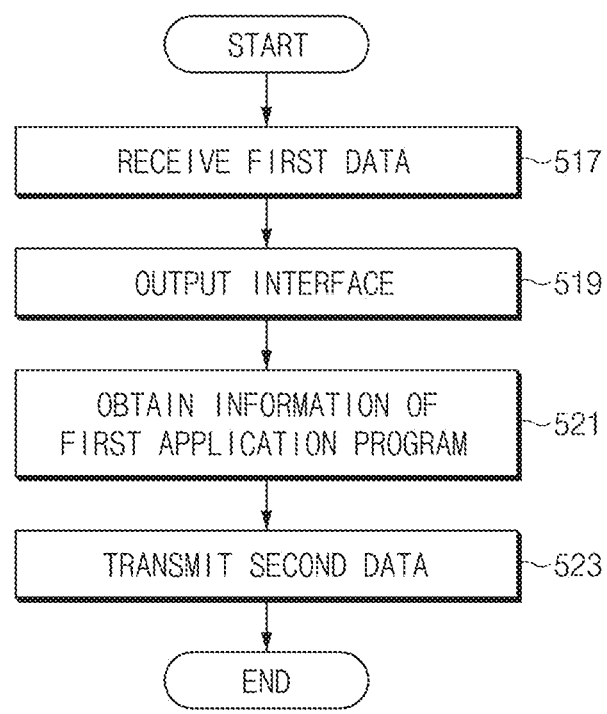
FIG. 5B is a diagram illustrating a service update providing method of the electronic device, according to an embodiment.

FIG. 5B is a diagram illustrating a service update providing method of the electronic device, according to an embodiment. Operations to be described with reference to FIG. 5B may be similar to, or correspond to, some of the operations described above with respect to FIG. 5A, and the following description will be focused on functional operations of the electronic device 100.

Referring to FIG. 5B, in step 517, the processor 140 of the electronic device 100 receives first data from the contents providing server 300 as the authentication server 200 authenticates the electronic device 100 as a target for an update of the first application program. The first data may be understood as a message generated by the contents providing server 300 according to the authentication of the electronic device 100 by the authentication server 200 and may include first information (e.g., account information, subscription information, operation history information, user information, or the like of the first application program) that corresponds to at least a portion of identification information of the electronic device 100 that the authentication server 200 provides to the contents providing server 300. Alternatively, the first data may include a first command for executing the first application program and/or a second command for loading relevant information of the first application program.

In 519, the processor 140 processes the first data to output a message interface on a screen area of the display 130. A specified object (e.g., a tap button) may be included in a partial area of the message interface, and the processor 140 may receive a user input applied to the object.

In step 521, in response to the user input, the processor 140 executes the first application program loaded in the electronic device 100 according to the first command and/or the second command included in the first data and may obtain the relevant information (e.g., account information, service subscription information, or the like) of the first application program by loading the relevant information in the memory 120.

In step 523, the processor 140 transmits second data corresponding to at least a portion (e.g., account information) of the obtained relevant information of the first application program to the contents providing server 300 to request an update of the first application program. The transmission of the second data by the processor 140 may help the contents providing server 300 to perform additional authentication of the electronic device 100. When the authentication of the electronic device 100 is completed by the contents providing server 300, the processor 140 may receive update data of the first application program from the contents providing server 300 and may process the update data to output relevant information or contents.

Figure 6:
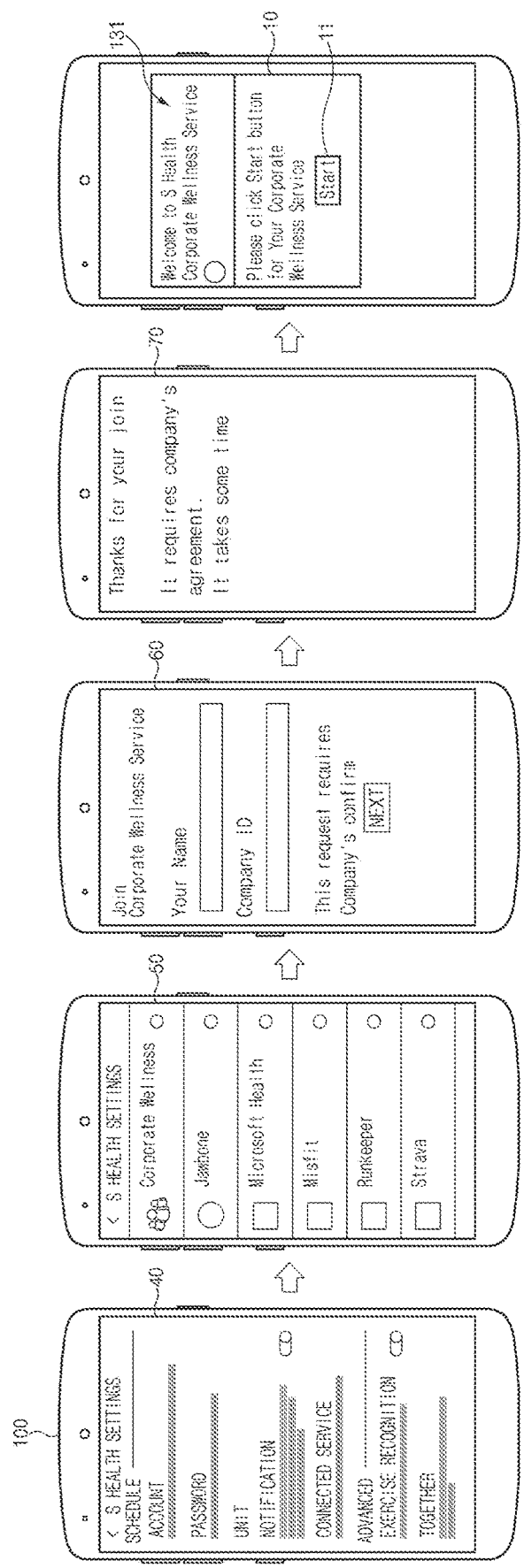
FIG. 6 is a diagram illustrating various screen interfaces related to an application for a service by the electronic device, according to an embodiment.

FIG. 6 is a diagram illustrating various screen interfaces related to an application for a service by the electronic device, according to an embodiment.

The above-described integrated service system 1000 may exclude the authentication server 200 and may include a separate server for authenticating a target for an update of the first application program. For example, the electronic device 100 and the contents providing server 300 may construct the integrated service system 1000 in conjunction with at least one server that operates a user directory system. Similar to the above-described authentication server 200, the user directory system may include identification information of an electronic device (or a user of the electronic device) that operates the first application program (e.g., account information, subscription information, operation history information, user information, or the like relevant to the first application program).

Referring to FIG. 6, and in connection with the above description, through a third interface 40 related to control of settings of the first application program (e.g., S health), a user of the electronic device 100 applies an input to a menu (e.g., a connected service) capable of synchronizing any web account and relevant information of the first application program stored in the electronic device 100. In this case, the processor 140 of the electronic device 100 switches the third interface 40 to a specified fourth interface 50. The fourth interface 50 may include, for example, a service list of at least one server that supports a service relevant to the first application program (or is related to the web account).

According to an embodiment, when the user selects a service on the fourth interface 50, the processor 140 outputs a fifth interface 60 that supports subscription for the selected service or creation of a service account. When the user enters user information into the fifth interface 60 in connection with the subscription for the selected service or the creation of the service account, the processor 140 may transmit at least one of the input information and the relevant information of the first application program stored in the memory 120 to a first server related to the selected service. The first server may compare the information received from the electronic device 100 with identification information on the user directory system in operation and may determine whether the received information and the identification information correspond to each other. In this operation (or at this time), the processor 140 of the electronic device 100 outputs a sixth interface 70 that represents a processing status for the determination of the first server as to whether the received information and the identification information correspond to each other.

When the information received from the electronic device 100 (e.g., at least one of the input user information and the relevant information of the first application program) corresponds to the identification information on the user directory system, the first server may notify the contents providing server 300 that the received information corresponds to the identification information. Accordingly, the contents providing server 300 may authorize the electronic device 100 (or the user of the electronic device 100) as a target for the update of the first application program and may transmit message data related to the update to the electronic device 100. The processor 140 of the electronic device 100 may process the message data to output the message interface 10 on a partial area of the display screen 131 and may perform update-related processing in response to a user input applied to the object 11 included in the message interface 10.

According to various embodiments, an electronic device (e.g., the electronic device 100 of FIG. 2) may include a communication module (e.g., the communication module 110 of FIG. 2), a memory (e.g., the memory 120 of FIG. 2) for storing a first application program, a display (e.g., the display 130 of FIG. 2), and a processor (e.g., the processor 140 of FIG. 2) electrically connected to the communication module, the memory, and the display.

The processor may receive a request related to update authority authentication for at least some groups, among a plurality of groups authenticated by using first information, from an external device based on the communication module in connection with an update of the first application program, may output a user interface related to the request based on the display, as at least a part of an operation of receiving the request, may transmit second information according to the request to the external device, based at least on a user input obtained by using the user interface such that the external device identifies update authority of the electronic device for the at least some groups by using the second information, and may display update information of the first application program obtained from the external device in connection with an operation of the first application program by using the display when the update authority of the electronic device is identified.

The processor may process at least a portion of the request by using relevant information of the first application program included in the electronic device in response to the user input.

The processor may receive first data including first information from a second external device in connection with an update of the first application program as a first external device authenticates the electronic device as a target for the update, may output a relevant interface by processing the first data, may obtain second information related to the first application program from the memory in response to a user input applied to at least a partial area of the interface, and may transmit second data related to a request for the update of the first application program to the second external device when the first information included in the first data and the second information correspond to each other.

The processor may receive the first data including at least one of information obtained by encrypting identification information of the electronic device, a first command related to execution of the first application program, and a second command related to acquisition of the second information, as at least a part of an operation of receiving the first data.

The processor may output the interface including at least one of update guide information of the first application program and an object to which a user input is applied in connection with start of the update of the first application program, as at least a part of an operation of outputting the interface.

The processor may obtain the information based on decoding of the encrypted information in response to a user input applied to at least a partial area of the object.

The processor may obtain the second information including at least one of account information, subscription information, operation history information, and user information related to the first application program from the memory by processing at least one of the first command and the second command, as at least a part of an operation of obtaining the second information.

The processor may determine whether the first application program corresponding to the first command is included in the electronic device, as at least a part of an operation of processing the first command.

The processor may determine whether the update guide information included in the interface is applicable to the first application program included in the electronic device, as at least a part of an operation of processing the first command.

The processor may receive specified authentication information from the first external device when the electronic device is included in an update target specified in connection with the update of the first application program.

The processor may receive at least one piece of information related to the updated first application program from the second external device when the second external device identifies a request of the electronic device for the update of the first application program, based on the second data.

According to various embodiments, an electronic device (e.g., the electronic device 100 of FIG. 2) may include a communication module (e.g., the communication module 110 of FIG. 2), a display (e.g., the display 130 of FIG. 2), and a processor (e.g., the processor 140 of FIG. 2).

The processor may receive a request related to user authority authentication for some user groups among a plurality ' of user groups authenticated by using first user information, from an external electronic device in connection with a health service by using the communication module, in which the receiving includes providing a user interface related to the request through the display, may identify a user input to the user interface, may transmit second user information related to the request to the external electronic device, based at least on the user input such that the external electronic device uses the second user information to determine whether the user is included in the some user groups, and may provide, through the display, health information about a plurality of users included in the some user groups obtained from the external electronic device in connection with the health service when the user is included in the some user groups.

The user input may include an input associated with using health information related to the some user groups.

A method for providing a service update by an electronic device may include receiving first data including first information from a first external device as a second external device authenticates the electronic device as a target for an update of a first application program, outputting a relevant interface by processing the first data, obtaining second information related to the first application program stored in the electronic device in response to a user input applied to at least a partial area of the interface, and transmitting second data related to a request for the update of the first application program to the first external device when the first information included in the first data and the second information correspond to each other.

The receiving of the first data may include receiving the first data including at least one of information obtained by encrypting identification information of the electronic device, a first command related to execution of the first application program, and a second command related to acquisition of the second information.

The outputting of the interface may include outputting the interface including at least one of update guide information of the first application program and an object to which a user input is applied in connection with start of the update of the first application program.

The method may further include obtaining the first information based on decoding of the encrypted information in response to a user input applied to at least a partial area of the object.

The obtaining of the second information may include processing at least one of the first command and the second command and obtaining the second information including at least one of account information, subscription information, operation history information, and user information related to the first application program, based on the processing.

The processing may include determining whether the first application program corresponding to the first command is included in the electronic device.

The processing may include determining whether the update guide information included in the interface is applicable to the first application program included in the electronic device.

The method may further include receiving specified authentication information from the second external device when the electronic device is included in an update target specified in connection with the update of the first application program.

The method may further include receiving at least one piece of information related to the updated first application program from the first external device when the first external device identifies a request of the electronic device for the update of the first application program, based on the second data.

Figure 7:
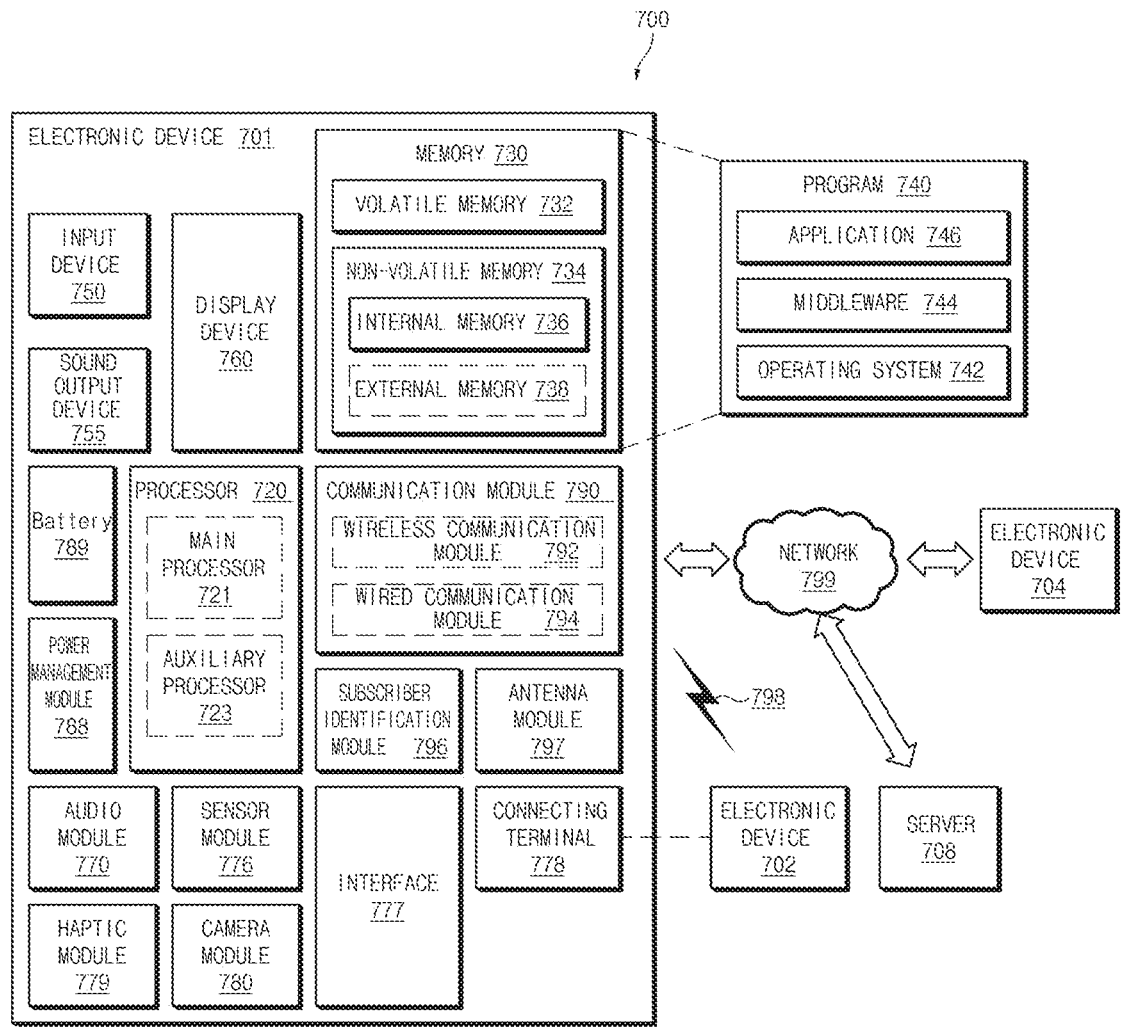
FIG. 7 is a diagram illustrating an electronic device in a network environment for providing a service update, according to an embodiment.

FIG. 7 is a diagram illustrating an electronic device in a network environment to provide a service update, according to an embodiment.

Referring to FIG. 7, an electronic device 701 (e.g., the electronic device 100 of FIG. 2) may communicate with a first external electronic device 702 through a first network 798 (e.g., a short-range wireless communication) or may communicate with a second external electronic device 704 or a server 708 through a second network 799 (e.g., a long-distance wireless communication) in the network environment 700. The electronic device 701 may communicate with the second external electronic device 704 through the server 708. The electronic device 701 includes a processor 720 (e.g., the processor 140 of FIG. 2), a memory 730 (e.g., the memory 120 of FIG. 2), an input device 750, a sound output device 755, a display device 760 (e.g., the display 130 of FIG. 2), an audio module 770, a sensor module 776, an interface 777, a haptic module 779, a camera module 780, a power management module 788, a battery 789, a communication module 790 (e.g., the communication circuit 110 of FIG. 2), a subscriber identification module 796, and an antenna module 797. At least one component (e.g., the display device 760 or the camera module 780) of the electronic device 701 may be omitted or other components may be added to the electronic device 701. Some components may be integrated and implemented as in the case of the sensor module 776 (e.g., a fingerprint sensor, an iris sensor, or an illuminance sensor) embedded in the display device 760 (e.g., a display).

The processor 720 may operate, for example, software (e.g., a program 740) to control at least one of other components (e.g., a hardware or software component) of the electronic device 701 connected to the processor 720 and may process and compute a variety of data. The processor 720 may load a command set or data, which is received from other components (e.g., the sensor module 776 or the communication module 790), into a volatile memory 732, may process the loaded command or data, and may store result data into a nonvolatile memory 734. The processor 720 includes a main processor 721 (e.g., a central processing unit (CPU) or an application processor (AP)) and an coprocessor 723 (e.g., a graphic processing device, an image signal processor, a sensor hub processor, or a communication processor), which operates independently from the main processor 721, additionally or alternatively uses less power than the main processor 721, or is specified to a designated function. In this case, the coprocessor 723 may operate separately from the main processor 721 or embedded.

The coprocessor 723 may control, for example, at least some of functions or states associated with at least one component (e.g., the display device 760, the sensor module 776, or the communication module 790) of the electronic device 701 instead of the main processor 721, while the main processor 721 is in an inactive (e.g., sleep) state or together with the main processor 721 while the main processor 721 is in an active (e.g., an application execution) state. The coprocessor 723 may be implemented as a part of another component (e.g., the camera module 780 or the communication module 790) that is functionally related to the coprocessor 723. The memory 730 may store a variety of data used by at least one component (e.g., the processor 720 or the sensor module 776) of the electronic device 701, for example, software (e.g., the program 740) and input data or output data with respect to commands associated with the software. The memory 730 includes the volatile memory 732 and/or the nonvolatile memory 734.

The program 740 may be stored in the memory 730 as software and includes, for example, an operating system 742, a middleware 744, and an application 746.

The input device 750 may be a device for receiving a command or data, which is used for a component (e.g., the processor 720) of the electronic device 701, from an outside (e.g., a user) of the electronic device 701 and may include, for example, a microphone, a mouse, or a keyboard.

The sound output device 755 may be a device for outputting a sound signal to the outside of the electronic device 701 and may include, for example, a speaker used for general purposes, such as multimedia play or recordings play, and a receiver used only for receiving calls. The receiver and the speaker may be either integrally or separately implemented.

The display device 760 may be a device for visually presenting information to the user and may include, for example, a display, a hologram device, or a projector and a control circuit for controlling a corresponding device. The display device 760 may include touch circuitry or a pressure sensor for measuring an intensity of pressure on the touch.

The audio module 770 may convert a sound and an electrical signal in dual directions. The audio module 770 may obtain the sound through the input device 750 or may output the sound through an external electronic device 702 (e.g., a speaker or a headphone) wired or wirelessly connected to the sound output device 755 or the electronic device 701.

The sensor module 776 may generate an electrical signal or a data value corresponding to an operating state (e.g., power or temperature) inside or an environmental state outside the electronic device 701. The sensor module 776 may include, for example, a gesture sensor, a gyro sensor, a barometric pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 777 may support a designated protocol wired or wirelessly connected to the external electronic device 702. The interface 777 may include, for example, a high-definition multimedia interface (HDMI), a universal serial bus (USB) interface, an SD card interface, or an audio interface.

A connection terminal 778 may include a connector that physically connects the electronic device 701 to the external electronic device 702, for example, an HDMI connector, a USB connector, an SD card connector, or an audio connector (e.g., a headphone connector).

The haptic module 779 may convert an electrical signal to a mechanical stimulation (e.g., vibration or movement) or an electrical stimulation perceived by the user through tactile or kinesthetic sensations. The haptic module 779 may include, for example, a motor, a piezoelectric element, or an electric stimulator.

The camera module 780 may shoot a still image or a video image. The camera module 780 may include, for example, at least one lens, an image sensor, an image signal processor, or a flash.

The power management module 788 may be a module for managing power supplied to the electronic device 701 and may serve as at least a part of a power management integrated circuit (PMIC).

The battery 789 may be a device for supplying power to at least one component of the electronic device 701 and may include, for example, a non-rechargeable (primary) battery, a rechargeable (secondary) battery, or a fuel cell.

The communication module 790 may establish a wired or wireless communication channel between the electronic device 701 and the external electronic device (e.g., the electronic device 702, the electronic device 704, or the server 708) and support communication execution through the established communication channel. The communication module 790 may include at least one communication processor operating independently from the processor 720 (e.g., the AP) and supporting the wired communication or the wireless communication. The communication module 790 includes a wireless communication module 792 (e.g., a cellular communication module, a short-range wireless communication module, or a global navigation satellite system (GNSS) communication module) or a wired communication module 794 (e.g., a local area network (LAN) communication module or a power line communication module) and may communicate with the external electronic device using a corresponding communication module among them through the first network 798 (e.g., the short-range communication network such as a Bluetooth, a WiFi direct, or according to an Infrared Data Association (IrDA standard)) or the second network 799 (e.g., the long-distance wireless communication network such as a cellular network, an internet, or a computer network (e.g., LAN or WAN)). The above-mentioned various communication modules 790 may be implemented into one chip or into separate chips, respectively.

According to an embodiment, the wireless communication module 792 may identify and authenticate the electronic device 701 using user information stored in the subscriber identification module 796 in the communication network.

The antenna module 797 may include one or more antennas to transmit or receive the signal or power to or from an external source. The communication module 790 (e.g., the wireless communication module 792) may transmit or receive the signal to or from the external electronic device through the antenna suitable for the communication method.

Some components among the components may be connected to each other through a communication method (e.g., a bus, a general purpose input/output (GPIO), a serial peripheral interface (SPI), or a mobile industry processor interface (MIPI)) used between peripheral devices to exchange signals (e.g., a command or data) with each other.

According to an embodiment, the command or data may be transmitted or received between the electronic device 701 and the external electronic device 704 through the server 708 connected to the second network 799. Each of the electronic devices 702 and 704 may be the same or different types as or from the electronic device 701. All or some of the operations performed by the electronic device 701 may be performed by another electronic device or a plurality of external electronic devices. When the electronic device 701 performs some functions or services automatically or by request, the electronic device 701 may request the external electronic device to perform at least some of the functions related to the functions or services, in addition to or instead of performing the functions or services by itself. The external electronic device receiving the request may carry out the requested function or the additional function and transmit the result to the electronic device 701. The electronic device 701 may provide the requested functions or services based on the received result as is or after additionally processing the received result. To this end, for example, a cloud computing, distributed computing, or client-server computing technology may be used.

The electronic device, according to an embodiment, may be various types of devices. The electronic device may include, for example, at least one of a portable communication device (e.g., a smartphone), a computer device, a portable multimedia device, a mobile medical appliance, a camera, a wearable device, or a home appliance. The electronic device according to an embodiment should not be limited to the above-mentioned devices.

It should be understood that various embodiments and terms used in the embodiments do not intend to limit technologies disclosed in the present disclosure to the particular forms disclosed herein; rather, the present disclosure should be construed to cover various modifications, equivalents, and/or alternatives of embodiments of the present disclosure. With regard to description of drawings, similar components may be assigned with similar reference numerals. As used herein, singular forms may include plural forms as well unless the context clearly indicates otherwise. In the present disclosure, the expressions "A or B", "at least one of A and B", "A, B, or C" or "one or more of A, B, and C", and the like, as used herein, may include any and all combinations of one or more of the associated listed items. The expressions "a first", "a second", "the first", or "the second", as used in herein, may refer to various components regardless of the order and/or the importance, but do not limit the corresponding components. The above expressions are used merely for the purpose of distinguishing a component from the other components. It should be understood that when a component (e.g., a first component) is referred to as being (operatively or communicatively) "connected," or "coupled," to another component (e.g., a second component), it may be directly connected or coupled directly to the other component or any other component (e.g., a third component) may be interposed between them.

The term "module", as used herein, may represent, for example, a unit including one or more combinations of hardware, software, and firmware. The term "module" may be interchangeably used with the terms "logic", "logical block", "part" and "circuit". A "module" may be a minimum unit of an integrated part or may be a part thereof. A "module" may be a minimum unit for performing one or more functions or a part thereof. For example, a "module" may include an application-specific integrated circuit (ASIC).

Various embodiments may be implemented by software (e.g., the program 740) including an instruction stored in a machine-readable storage media (e.g., an internal memory 736 or an external memory 738) readable by a machine (e.g., a computer). The machine may be a device that calls the instruction from the machine-readable storage media and operates depending on the called instruction and may include the electronic device 701. When the instruction is executed by the processor 720, the processor may perform a function corresponding to the instruction directly or using other components under the control of the processor. The instruction may include a code generated or executed by a compiler or an interpreter. The machine-readable storage media may be provided in the form of non-transitory storage media. Here, the term "non-transitory", as used herein, is a limitation of the medium itself (i.e., tangible, not a signal) as opposed to a limitation on data storage persistency.

According to an embodiment, the method may be provided as a part of a computer program product. The computer program product may be traded between a seller and a buyer as a product. The computer program product may be distributed in the form of machine-readable storage medium (e.g., a compact disc read only memory (CD-ROM)) or may be distributed only through an application store. In the case of online distribution, at least a portion of the computer program product may be temporarily stored or generated in a storage medium such as a memory of a manufacturer's server, an application store's server, or a relay server.

Each component (e.g., the module or the program) according to various embodiments may include at least one of the above components, and a portion of the above sub-components may be omitted, or additional other sub-components may be further included. Alternatively or additionally, some components (e.g., the module or the program) may be integrated in one component and may perform the same or similar functions performed by each corresponding components prior to the integration. Operations performed by a module, a programming, or other components according to various embodiments may be executed sequentially, in parallel, repeatedly, or in a heuristic method. Also, at least some operations may be executed in different sequences, omitted, or other operations may be added.

While the present disclosure has been shown and described with reference to various embodiments thereof, it will be understood by those skilled in the art that various changes in form and detail may be made therein without departing from the spirit and scope of the present disclosure as defined by the appended claims and their equivalents.

What is claimed is:

1. An electronic device comprising:
    a communication module;
    a memory configured to store a first application program;
    a display; and
    a processor electrically connected to the communication module, the memory, and the display,
    wherein the processor is configured to:
        receive a request from an external device via the communication module, the request being related to update authority authentication for at least some groups, among a plurality of groups authenticated by using first information, in connection with an update of the first application program;
        output, via the display, a user interface related to the request;
        obtain second information related to the first application program from the memory, based at least on a user input obtained via the user interface;

transmit data including at least a portion of the obtained second information to the external device such that the external device identifies an update authority of the electronic device for the at least some groups by using the data; and display, via the display, update information of the first application program obtained from the external device in connection with an operation of the first application program, when the update authority of the electronic device is identified.

2. The electronic device of claim 1, wherein the processor is further configured to process at least a portion of the request by using relevant information of the first application program included in the electronic device in response to the user input.

3. The electronic device of claim 1, wherein the first application program comprises a health service.

4. The electronic device of claim 1, wherein the first information comprises health information related to the at least some groups.

5. An electronic device comprising:
a communication module;
a memory configured to store a first application program;
a display; and
a processor electrically connected to the communication module, the memory, and the display,
wherein the processor is configured to:
receive, from a first external device, first data including first information in connection with an update of the first application program as a second external device authenticates the electronic device as a target for the update;
output a relevant interface by processing the first data;
obtain second information related to the first application program from the memory in response to a user input applied to at least a partial area of the interface; and
transmit second data related to a request for the update of the first application program to the first external device, when the first information included in the first data corresponds to the second information.

6. The electronic device of claim 5, wherein the processor is further configured to receive the first data including at least one of information obtained by encrypting identification information of the electronic device, a first command related to execution of the first application program, and a second command related to acquisition of the second information.

7. The electronic device of claim 6, wherein the processor is further configured to output the interface including at least one of update guide information of the first application program and an object to which a user input is applied in connection with start of the update of the first application program.

8. The electronic device of claim 7, wherein the processor is further configured to obtain the second information including at least one of account information, subscription information, operation history information, and user information related to the first application program from the memory by processing at least one of the first command and the second command.

9. The electronic device of claim 8, wherein the processor is further configured to determine whether the first application program corresponding to the first command is included in the electronic device.

10. The electronic device of claim 8, wherein the processor is further configured to determine whether the update guide information included in the interface is applicable to the first application program included in the electronic device.

11. The electronic device of claim 5, wherein the processor is further configured to receive specified authentication information from the second external device when the electronic device is included in an update target specified in connection with the update of the first application program.

12. The electronic device of claim 5, wherein the processor is further configured to receive at least one piece of information related to the updated first application program from the first external device when the first external device identifies a request of the electronic device for the update of the first application program, based on the second data.

13. A method for providing a service update by an electronic device, the method comprising:
receiving, from a first external device, first data including first information as a second external device authenticates the electronic device as a target for an update of a first application program;
outputting a relevant interface by processing the first data;
obtaining second information related to the first application program stored in the electronic device in response to a user input applied to at least a partial area of the interface; and
transmitting second data related to a request for the update of the first application program to the first external device when the first information included in the first data corresponds to the second information.

14. The method of claim 13, wherein receiving the first data comprises:
receiving the first data including at least one of information obtained by encrypting identification information of the electronic device, a first command related to execution of the first application program, and a second command related to acquisition of the second information.

15. The method of claim 14, wherein outputting the interface comprises:
outputting the interface including at least one of update guide information of the first application program and an object to which a user input is applied in connection with start of the update of the first application program.

16. The method of claim 14, wherein obtaining the second information comprises:
processing at least one of the first command and the second command; and
obtaining the second information including at least one of account information, subscription information, operation history information, and user information related to the first application program, based on the processing.

17. The method of claim 16, wherein processing at least one of the first command and the second command comprises:
determining whether the first application program corresponding to the first command is included in the electronic device.

18. The method of claim 16, wherein processing at least one of the first command and the second command comprises:
determining whether the update guide information included in the interface is applicable to the first application program included in the electronic device.

19. The method of claim 13, further comprising:
receiving specified authentication information from the second external device when the electronic device is included in an update target specified in connection with the update of the first application program.

20. The method of claim 13, further comprising:
receiving at least one piece of information related to the updated first application program from the first external device when the first external device identifies a request of the electronic device for the update of the first application program, based on the second data.

* * * * *